June 25, 1963 J. V. FERRIOT 3,095,260
PROCESS FOR PRODUCING PLASTIC ARTICLES
Filed Sept. 20, 1960 2 Sheets-Sheet 2
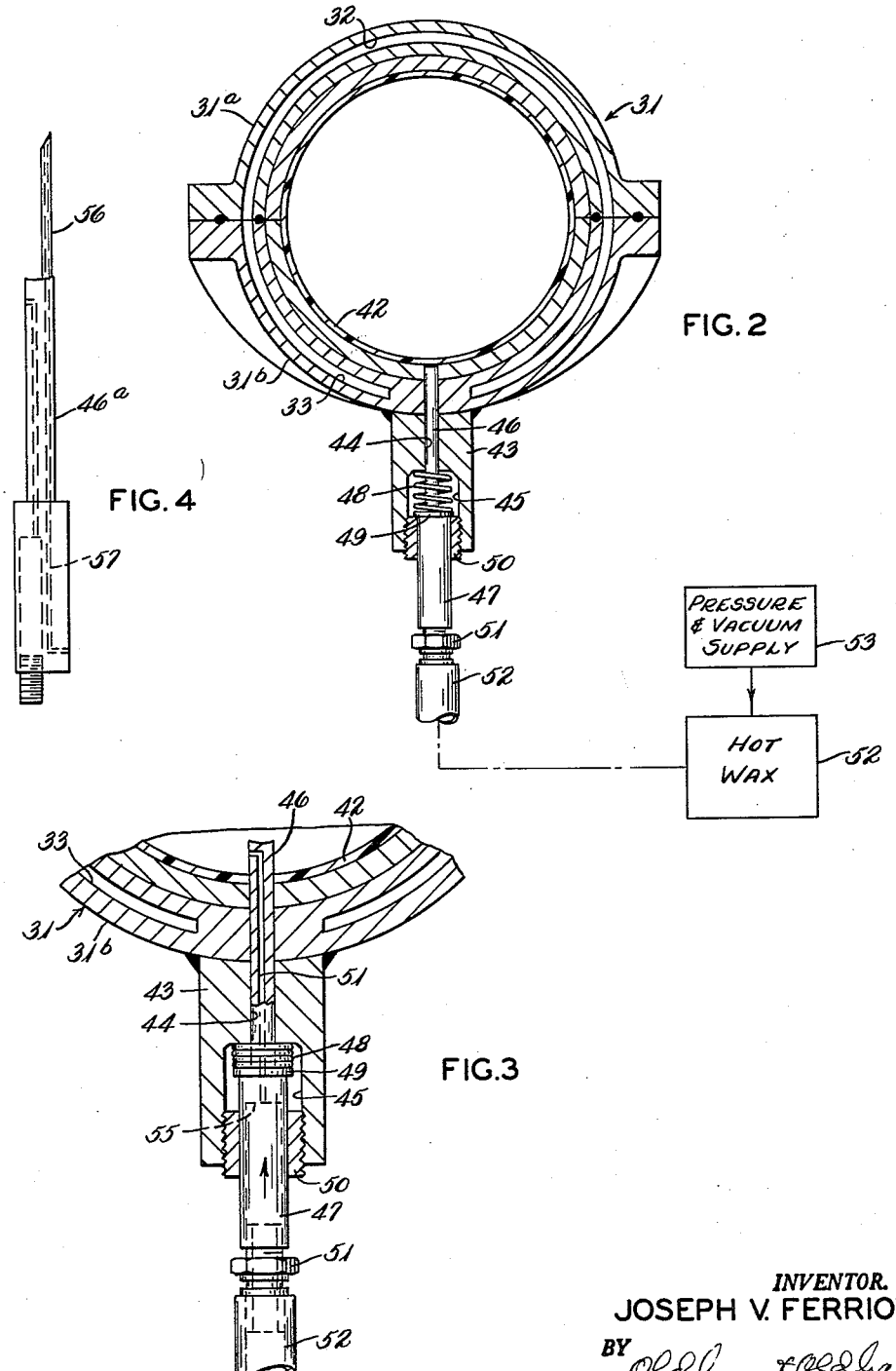
INVENTOR.
JOSEPH V. FERRIOT

United States Patent Office 3,095,260
Patented June 25, 1963

3,095,260
PROCESS FOR PRODUCING PLASTIC ARTICLES
Joseph V. Ferriot, Akron, Ohio, assignor to Ferriot Brothers, Incorporated, Akron, Ohio, a corporation of Ohio
Filed Sept. 20, 1960, Ser. No. 57,274
8 Claims. (Cl. 18—58.3)

The present invention relates to the production of hollow plastic articles from materials, such as vinyl plastisols and other thermosetting materials, processed in sectional molds.

Heretofore in the production of hollow articles from plastic materials, there have been quite a few different types of apparatus and processes developed for making these hollow articles and many of these processes have used rotational apparatus adapted to distribute a charge of liquid plastisol material over the inner surfaces of the mold while the mold is being rotated on multi-planar axes. A typical apparatus for such work is shown in Delacoste et al. Patent No. 2,624,072 whereas another typical apparatus for practicing a process of the general type described is shown in U.S. Patent No. 2,681,472.

In general, these machines usually are set up to process closed molds in the machine by rotation on multi-planar axes through an initial step of starting to gel, fuse, or set the plastisol material within the mold, and then to further heat the mold to complete the solidification or fusing of the plastisol material. Usually the articles in the molds are cooled prior to opening the molds and taking the articles from the machine. The machines have an operative cycle of between 10 to 15 minutes.

Large producers of hollow articles from plastisol material have naturally always been desirous of obtaining maximum production from a given machine, but certain operative limits, including relatively long formation cycles, restrict production in the types of machines and processes heretofore developed.

The general object of the present invention is to provide a novel and improved process for producing hollow articles from liquid thermosetting materials and with the process and apparatus being characterized by the effective and positive control of heat flow to the mold in which the processed material is received, and to the article being produced in the mold.

Another object of the invention is to form a hollow article from an initially liquid thermosetting material wherein a hot liquid wax is introduced into a mold cavity after the liquid material has been partially set up on the margins of the mold cavity and with the hot liquid wax material completing the setting of the initially liquid material to provide it with desired strength characteristics.

Another object of the present invention is to provide a method for rotationally forming hollow articles where thermosetting materials are processed and where the machine can be operated at ambient temperatures in a room or factory and with all working components of the machine being exposed to the atmosphere.

A further object of the invention is to maintain molds for the production of hollow articles at a more or less substantially common or level temperature condition.

Another object of the invention is to form hollow articles from thermosetting materials where the cycle or turnover of the molds, particularly in rotationally casting operations, is greatly increased in speed with regard to prior art practices.

Another object is to provide heat to a hollow molded article of the class described from the interior of such article.

Further objects of the invention are to process liquid thermosetting material in an efficient manner to rapidly set such material to produce hollow articles therefrom; to finalize the setting or fusing of a partially solidified or gelled thermosetting material to complete the setting thereof by heat applied to the internal surface of such partially solidified, or gelled layer; to obtain increased mold life by maintaining the molds at substantially even temperatures during a cycle of article formation; and to simplify rotational casting machines in the heat control means provided therefor for use in initially gelling or solidifying liquid thermosetting material in the molds being rotated.

The foregoing and other objects and advantages of the invention will be made more apparent as the specification proceeds.

In the accompanying drawings:

FIG. 2 is a fragmentary enlarged section through a mold after being removed from the apparatus of FIG. 1 and showing apparatus for the introduction of hot liquid wax into the mold cavity;

FIG. 3 is an enlarged fragmentary section showing the puncturing of the initial layer of the material formed over the mold cavity wall when hot liquid is forced into the mold cavity; and FIG. 4 is an elevation, partly in section, of a modified valve of the invention.

When referring to corresponding members shown in the drawings and referred to in the specification, corresponding numerals are used to facilitate comparison therebetween.

Figure 1:
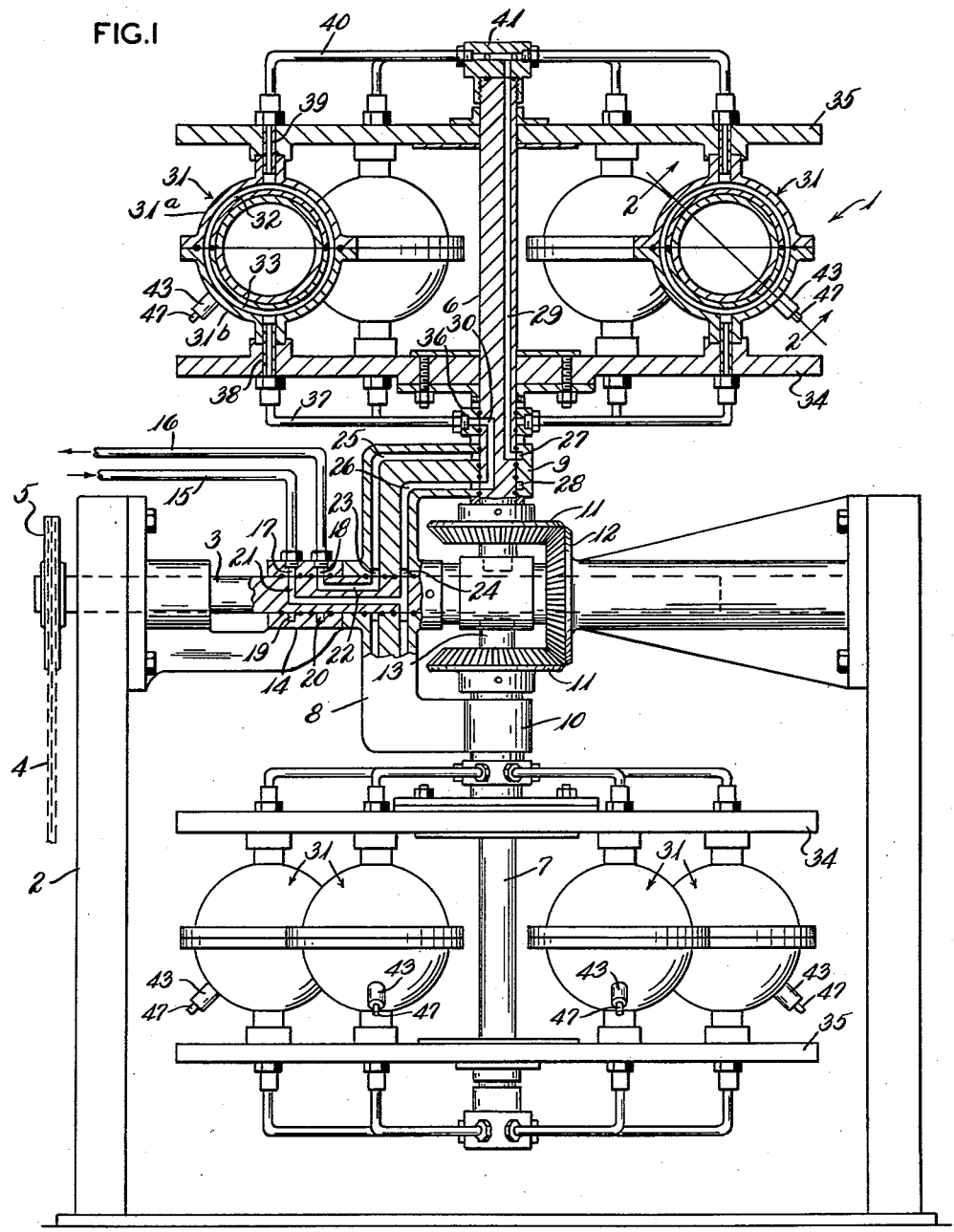
FIG. 1 is an elevation, partially broken away and shown in vertical section, of apparatus embodying and for practicing some of the principles of the invention.

It should be realized that the present invention relates to any known processes for rotationally or otherwise forming hollow articles from liquid thermosetting material. Particularly, the present invention is adapted for use with vinyl resin plastisols, and the like, and other known materials or other similar plastic materials, such as styrene foam, polyurethane or polyethylene materials, or the like, whenever suitable, can be used in practice of the process of the invention. Generally, with use of these plastic materials, and especially when using vinyl resins, the process of solidifying the initial liquid material is a progressive action. This progressive action may be termed a "fusing" action, or it may be called a gelling and fusing action, where the initial solidification of the material would be termed the gelling of the material and wherein a relatively weak, but solid material is formed. Such initial solidified plastisol then must be heated to a higher temperature, such as about 350° F., in order to complete the solidification, fusing or final strengthening thereof. Initially the material will solidify, or gel at approximately 125° F.

Reference now is particularly directed to the details of the structures shown in the accompanying drawings, and in FIG. 1, apparatus for practicing the process of the invention is indicated as a whole by the numeral 1. The apparatus 1 includes a frame 2 in which a suitable support shaft 3 is journalled. The shaft 3 is driven by a suitable member which may include a chain 4 engaged with a sprocket 5 secured to the shaft 3 whereby the shaft 3 and members secured thereto can be rotated at a desired rate around the axis of the shaft 3.

A pair of support shafts or spindles 6 and 7 are secured to the shaft 3 for rotation therewith but likewise for rotation on the axis of the spindles 6 and 7 concurrently with the rotation of these spindles 6 and 7 about the shaft 3 with rotation of such driven shaft 3. These spindles 6 and 7 are secured to the shaft 3, as by a yoke 8 carried by and secured to the shaft 3 and including sleeve-like ends 9 and 10 in which the spindles 6 and 7 are received. The spindles 6 and 7 each carry a beveled gear 11 secured thereto adjacent the shaft 3 and engaging a stationary beveled gear 12 carried by or secured to a portion of the frame 2. Usually the radially inner end of the spindles 6 and 7 are suitably journalled in a sleeve or boss portion provided on the shaft 3. A suitable thrust bearing 13, or similar member may be provided intermediate the beveled gear 11 and the ends 9 and 10 of the yoke 8 to aid in securing the spindles 6 and 7 to the shaft 3, but to permit axial rotation of the spindles 6 and 7 by the means hereinafter described.

An important feature of the present invention is that means are provided in the apparatus 1 for circulating a heating and/or cooling liquid through or in immediate contact with molds being processed in the apparatus of the invention. To this end, a member such as a sleeve 14, secured to the frame 2, engages the shaft 3. This sleeve 14 has a fluid inlet conduit 15 connected thereto as well as a fluid exhaust conduit 16. These conduits have bores 17 and 18, respectively, formed in the sleeve 14 connected thereto and annular grooves 19 and 20 are likewise formed on the inner surface of the sleeve 14 and connect to the bores 17 and 18 whereby fluid is continually supplied to these grooves 19 and 20. Fluid flow from the grooves 19 and 20 is provided by means of bores 21 and 22, respectively, formed in the shaft 3 and extending axially thereof to connect to grooves 23 and 24, respectively, formed in the inner surface or bore of the portion of the yoke 8 engaging the shaft 3. Thus fluid will be supplied to these grooves 23 and 24 continuously for flow therefrom through connecting bores or conduits 25 and 26 formed in the arms of the yoke 8 and extending to the ends 9 and 10 thereof.

For additional fluid control, FIG. 1 clearly brings out how annular grooves 27 and 28 are formed in the bore of the ends of the yoke 8 and with such grooves connecting to the bores 25 and 26, respectively, for fluid flow thereto. Connecting bores 29 and 30 are formed in the spindles 6 and 7 for fluid flow to and from molds positioned on the spindles 6 and 7. Molds 31 are shown for forming spherical balls in the apparatus described and these molds are made in two parts 31a and 31b with each part or section having a recess 32 and 33, respectively, formed therein. The recesses 32 and 33 connect for fluid flow between the mold sections when they are secured together whereby heating or cooling fluid can be supplied to one end of the mold and be withdrawn from the opposite end of the mold. The molds are positioned by carrier plates 34 and 35 that are suitably secured to the spindles 6 and 7 and move as a unit therewith.

An inlet sleeve 36 is secured to and carried by the spindle 6 and connects to the bore 30 therein for fluid flow to a connector conduit 37 connecting to the sleeve 36 and extending to conventional fittings connecting to a carrier conduit or bore 38 extending through the plate 34 and connecting to the fluid cavity 33 in the mold section 31b for fluid flow thereto. Heater or coolant fluid is exhausted from the companion mold cavity 32b by a conduit 39, similar to the conduit 38, and which connects to a connector conduit 40. The conduit 40 extends to a manifold or connector block 41 suitably carried by and secured to the end of the spindle 6 and connecting to the exhaust bore 29 formed therein for completion of the flow of fluid to and from the rotating molds 31 positioned in the apparatus of the invention.

It will be realized that any conventional type of fluid flow and connector means may be used in the apparatus of the invention, and that an operative embodiment of the invention has been disclosed but that modifications may be made therein as desired. In all events, the apparatus 1 of the invention can be positioned in a room or other area for operation without any temperature control oven being associated with the apparatus and with full control of the temperatures of the molds and material being processed being provided by the control fluid circulating through the mold as the apparatus is used. Thus the molds will normally be maintained at a temperature of, for example, about 125° F. to provide initial solidification of the material being processed. This solidification results in relatively weak, but solid material being formed and coating the entire mold surfaces. Normally all of the initial liquid plastisol is deposited on the mold surfaces as a solid.

As in the practice of prior processes of this type, a suitable measured quantity of the thermosetting liquid material is introduced into one of the mold cavities and thereafter the mold cavity is closed by the two mold sections being secured together in a conventional manner. This liquid material will not completely fill the mold and normally is of only sufficient volume to form a layer approximatey ⅛ to ⁵⁄₁₆ of an inch, for example, over the mold surfaces.

After this thermosetting material has been gelled, or initially solidified over the mold cavity surfaces, then the spindles 6 and 7 normally would be removed from association with the remainder of the apparatus 1. The spindles 6 and 7 may be secured in position, for example, solely by set screws affixing the gears 11 to the spindles. The individual molds can then be suitably individually processed in accordance with the remaining steps of the process of the invention. One such mold is shown in FIG. 2 where this mold 31 has a layer of gelled material 42 coating the inner surface of the mold. A filling or control stem 43 is secured to one part of this mold 31 and normally extends substantially radially therefrom. The stem 43 has a bore 44 therein and the end is counterbored at 45 so that a control valve 46 can be slidably positioned in the bore 44 and have an enlarged head 47 received in the counterbore 45. The valve 46 is urged outwardly of the mold 31 by a spring 48 that is compressed between the inner end of the valve head 47 and the shoulder provided by the counterbore 45. A washer 49 having a larger diameter than the valve head 47 may be suitably secured to such valve adjacent the inner end of the valve head 48 so that the washer 49 will engage a lock sleeve 50 secured to a tapped portion of the counterbore 45 in the control stem 43. Normally the valve 46 is positioned so that the inner end thereof extends through a portion of the wall of the mold 31 to form a surface portion of the mold cavity. The valve 46 has a valve bore 51 provided therein and terminating at the valve wall short of the axially or radially inner end of the valve but extending effectively the length of the valve 46 so that when a suitable fitting 51 is secured to the outer end of the valve, a supply conduit 52 can be effectively connected to the bore 51 of the valve 46.

It is an important feature of the invention that heat be supplied internally of the article formed in the mold, and for such function, the supply conduit 52 connects to a suitable source, as indicated in FIG. 2, of a liquid wax material. Preferably this liquid wax is at a temperature of, for example, about 350° F. which is the fusing or final temperature required for solidifying a vinyl plastisol thermosetting material. Paraffin or other waxes that are liquids in the temperature ranges involved may be used. Any conventional means 53 for pressure and vacuum supply connect to a supply chamber or tank 54 for the hot wax. The tank 54 connects to the conduit 52 so that such tank and the liquid wax therein can have either a pressure and/or a vacuum exerted thereon through the means 53. A shoulder 55 is provided in the bore 51 and the pressure exerted by the hot wax on the shoulder 55 is sufficient to compress the spring 48 and permit flow of hot wax to the interior of the mold 31 to fill such mold with a hot liquid that is in direct contact with the gelled layer 42 formed on the mold surfaces. Hence, a rapid, effective, and efficient heat transfer action is scured between the hot liquid wax and the material in the gelled layer 42 so that the fusing and/or final setting thereof is rapidly effected. Thereafter, the control member 54 is changed either automatically or manually, as desired, to set up a vacuum on the hot wax in the tank 52 whereby the hot wax will be withdrawn from the mold cavity 31.

FIG. 4 of the drawing shows a valve 46a that may be used in place of, or in conjunction with the valve 46. The valve 46a has a hollow vent needle or tube 56 formed thereon or secured thereto to extend into the mold cavity to the upper end thereof to vent air to and from the mold cavity as it is filled with or emptied of hot wax. The valve 46 may be readily releasable from the mold 31 after an article is formed on the mold cavity surface and be replaced by the valve 46a. The valve 46 might even be replaced by a mold cavity sealing member if the valve 46a is to be used for final fusing or setting of the plastic material.

Thereafter if any positive cooling action is required, a coolant material can be introduced into the mold cavities through the valve 46 by connecting another supply conduit to the fitting 51, or coolant may be circulated through the recesses 32 and 33, or else after a suitable interval of time, the mold 31 can be opened and the finished article can be taken therefrom. It will be noticed that there is a small filling opening left in the article produced when the valve 46 is permitted to go back to its normal position. This filling opening can be at a place in, for example, a doll head or other article, which is normally open or cut in use of the finished article, or if a completely enclosed sphere is desired, this opening can be sealed by application of a suitable plastic material thereto and solidification thereof in place, as desired, by local heating of the article. The opening in the article might be sealed by supply of a small quantity of liquid thermosetting material, like that originally used, to the mold after the wax is withdrawn and the residual heat in the article and mold would solidify the material in proper shape. Additional heat could be applied later if needed for complete thermosetting action.

From the foregoing, it is believed that an improved, rapid process has been provided for forming hollow articles by rotational casting action and that the objects of the invention have been achieved.

It also is within the scope of the invention to process the molds in the apparatus 1 for the entire time of formation and hence to oscillate, or rotate the mold 31 with the hot wax therein where the mold has not been vented to distribute the heating fluid over all mold cavity surfaces. The invention preferably supplies heat to the interior of the hollow articles without venting them. If vented, the articles can be released from their molds at higher temperatures with little or no cooling thereof in the molds in some instances.

The invention also includes the method of producing plastic articles by rotation of a mold with a charge of plastisol, or liquid resin therein and then controlling the setting, or fusing of the liquid in the mold by supply of heating fluid to the cavities 32 and 33 in the mold jackets. Such heat supply may be at a uniform temperature, or it may be of increasing temperature in two or more steps. Furthermore, the heat may be continually or intermittently supplied, as desired, and a rapid heating of the mold and its contents can be secured by conduction through the mold.

Any suitable inert liquid may be used as the heating material provided in the tank 52. It also will be realized that the hollow vent needle 56 may be of any suitable length.

The heating and/or cooling jacket provided may be integral with the molds, or be separate therefrom but in intimate contact therewith. Hence the temperature control liquid can be circulated through the recesses 32 and 33 as the molds are being rotated and use of a temperature control oven is avoided.

While one complete embodiment of the invention has been disclosed herein, it will be appreciated that modification of this particular embodiment of the invention may be resorted to without departing from the scope of the invention as defined in the appended claims.

What is claimed is:

1. In a process for making hollow articles from thermosetting vinyl plastisols and like liquid materials, the steps of forming a weak gelled layer of plastisol over a mold cavity surface, breaking the layer and introducing a liquid hot wax at, at least, the fusing temperature for the plastisol into the mold cavity to contact the gelled plastisol on its inner surface to complete the solidification of the plastisol, and withdrawing the hot wax from the cavity.

2. In a process for making hollow articles from liquid thermosetting plastic materials, the steps of solidifying the liquid over a sectional mold cavity surface to form a layer thereon, breaking the layer, introducing a liquid wax heated at least to the fusing temperature for the plastic into the mold cavity to complete the solidification of the plastic rapidly, withdrawing the hot wax from the cavity, cooling, and opening the mold to obtain the article produced.

3. In the process for making hollow articles from vinyl plastisols and other thermosetting liquids, the steps of pouring a measured quantity of a thermosetting liquid material into a multi-section mold, closing the mold, forming a thin layer of solidified material over the entire mold cavity surface from all of the liquid material, breaking the layer, introducing a liquid wax heated to a temperature above the setting temperature for the material into the mold cavity to contact the inner surface of the material to complete the solidification of the material rapidly, withdrawing the hot wax from the cavity, closing the opening in the layer, cooling, and opening the mold to obtain the article.

4. In a process for making hollow articles by rotational casting, the steps of introducing a charge of liquid material into a mold for the hollow article which material is capable of being progressively solidified and strengthened by heat and which material placed in the mold is less in volume than the mold cavity, completely closing the mold, rotating the mold to distribute the liquid material over the surface thereof, circulating a hot liquid around the mold while rotating it to solidify the material on the mold surfaces and form a rather weak layer over the mold surfaces from all of the initial liquid, terminating rotation of the mold, breaking the layer over the mold surfaces to form an opening therein, forcing a hot wax liquid material into the mold through the opening therein to fill the mold cavity and press the solidified layer against the mold cavity, such wax material being at an elevated temperature sufficient to complete the solidification of the initial liquid material, and withdrawing the hot wax material after the initially liquid material has been fully thermoset.

5. In a process for making hollow articles by rotational casting, the steps of introducing a charge of liquid material into a sectional mold for the hollow article which material is capable of being progressively solidified and strengthened by heat and which material placed in the mold is less in volume than the mold cavity, closing the mold, rotating the mold on a plurality of axes to distribute the liquid material over the cavity surface thereof and to gel all of the charged material, heat being supplied to the material to solidify it and form a weak gel layer over the mold surfaces, terminating rotation of the mold, breaking the layer over the mold surfaces and forcing a hot wax liquid material into the mold through the opening therein to fill the mold cavity and press the solidified layer against the mold cavity, such wax material being at an elevated temperature sufficient to complete the thermosetting of the initial liquid material and being inert to the material being processed, withdrawing the hot wax material after the initially liquid material has been fully set, cooling the mold, and opening the mold to obtain the article.

6. In a process for making hollow articles by rotational casting, the steps of introducing a charge of liquid material into a sectional mold for the hollow article which material is capable of being progressively solidified and strengthened by heat and which material placed in the mold is less in volume than the mold cavity, closing the mold, rotating the mold to distribute the liquid material over the surface thereof, heating the mold while rotating it to solidify all of the material on the mold surfaces and form a rather weak layer over the mold surfaces, terminating rotation of the mold, breaking the layer over the mold surfaces to form an opening therein, forcing an inert liquid material into the mold through the opening therein to fill the mold cavity and press the solidified layer against the mold cavity, such inert liquid material being at an elevated temperature sufficient to complete the solidification of the initial liquid material, letting the hot inert liquid stand in the mold to heat the layer of material therein, and withdrawing the hot inert liquid material after the initially liquid material has been fully set.

7. A process as in claim 6 where the interior of the mold cavity is vented to the atmosphere when the hot inert liquid is in the mold.

8. In the process for making hollow articles from vinyl plastisols and other thermosetting liquids, the steps of pouring a measured quantity of a thermosetting liquid material into a multi-section mold, closing the mold, forming a thin layer of solidified material over the entire mold cavity surface from all of the liquid mold charge, breaking the layer, introducing a liquid heated to a temperature above the setting temperature for the material into the mold cavity to complete the solidification of the material, said inert liquid having no reaction with said thermosetting material except for heat transfer thereto, withdrawing the hot liquid from the cavity, closing the opening in the layer, cooling, and opening the mold to obtain the article.

References Cited in the file of this patent

UNITED STATES PATENTS

| | | |
|---|---|---|
| 803,799 | Voelke | Nov. 7, 1905 |
| 1,161,966 | Price | Nov. 30, 1915 |
| 1,808,226 | Hopkinson et al. | June 2, 1931 |
| 2,066,265 | Freeman | Dec. 29, 1936 |
| 2,536,692 | Miller | Jan. 2, 1951 |
| 2,838,798 | Rekettye | June 17, 1958 |

OTHER REFERENCES

| | | |
|---|---|---|
| 1,182,285 | France | June 24, 1959 |